Nov. 17, 1953
C. BERG ET AL
2,659,189
POTATO HARVESTING MACHINE AND
SEPARATING CONVEYER THEREFOR
Filed Dec. 5, 1949
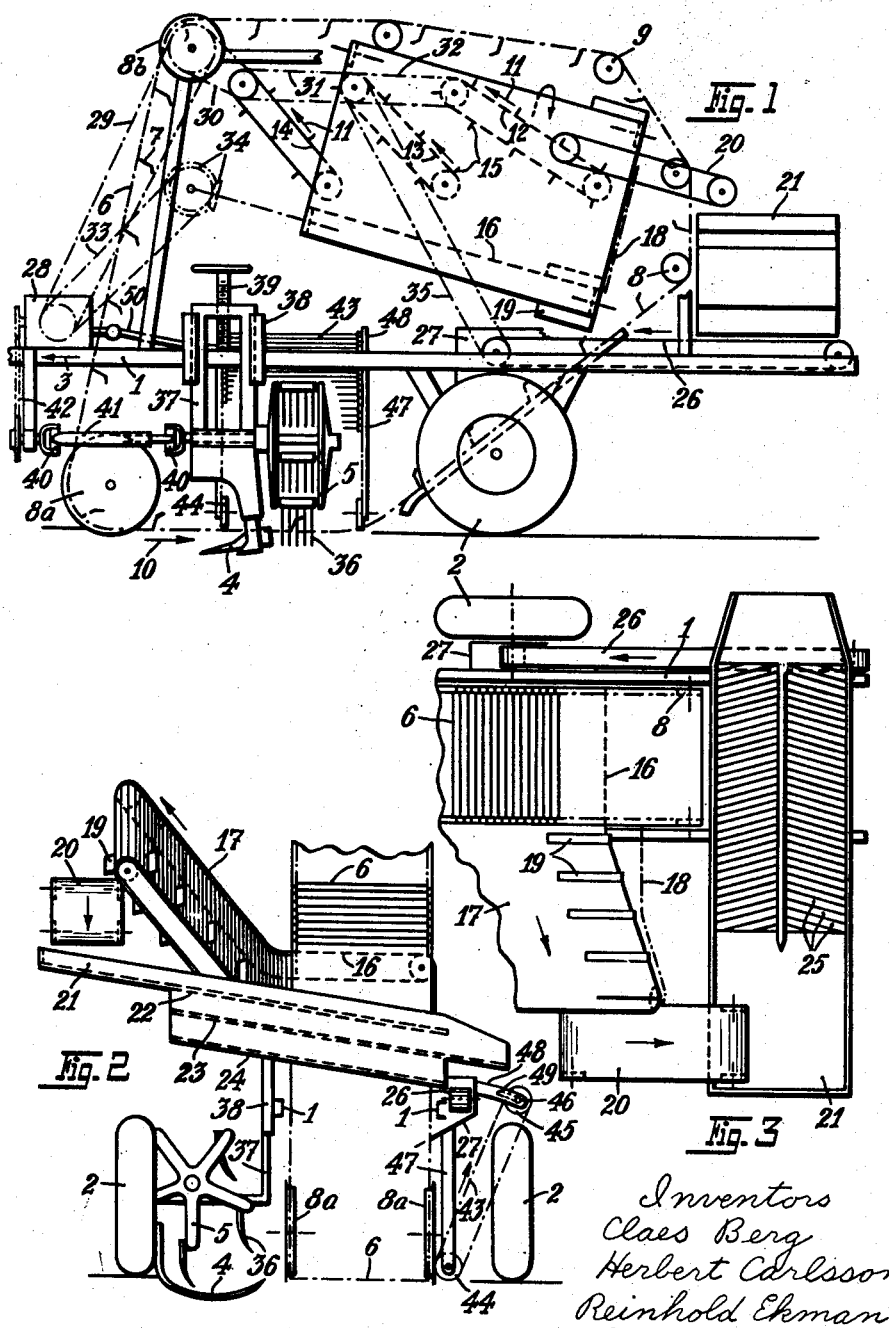
Inventors
Claes Berg
Herbert Carlsson
Reinhold Ekman
by Sommers + Young
Attorneys Patented Nov. 17, 1953

2,659,189

UNITED STATES PATENT OFFICE 2,659,189

POTATO HARVESTING MACHINE AND SEPARATING CONVEYER THEREFOR

Claes Berg, Herbert Carlsson, and Reinhold Valentin Ekman, Overum, Sweden, assignors to Aktiebolaget Överums Bruk, Overum, Sweden, a Swedish joint-stock company Application December 5, 1949, Serial No. 131,234

5 Claims. (Cl. 55—137)

This invention relates to machines for harvesting potatoes, or crops of a like character and growth, and more particularly to machines of the type having an endless elevator for the dug plants. A primary object of the invention is to provide a machine of this type which will be reliable in operation and relatively simple and compact in construction. With the above and other objects in view the invention consists in the construction and novel combination and arrangement of parts hereinafter described, illustrated in the accompanying drawing and pointed out in the claims hereunto appended.

The invention will be more particularly described in the following with reference to the accompanying drawing wherein Fig. 1 is a diagrammatic side view, Fig. 2 a fragmentary rear end view, and Fig. 3 a fragmentary plan view of a potato harvesting machine according to the invention.

The various parts of the machine are mounted on a frame 1, in turn supported by a pair of wheels 2 and intended to be coupled to a tractor travelling in the direction of the arrow 3, which is parallel to the plant rows. The machine has an endless, grated elevator chain 6 provided on its inside with transverse flights 7. The elevator passes over pairs of wheels 8, 9 in a path parallel to a vertical plane through the travelling direction of the machine, a continuous motion in the direction of the arrow 10 being imparted to the elevator by means of a suitable power unit 28, such as a gear box driven from the tractor, and a chain transmission 29 operating the upper front sprocket wheel pair 8b. Behind the lower front wheels 8a the elevator has a horizontal plant receiving part adapted in operation to rest on the ground, preferably without materially moving relative thereto, the speed of the elevator being substantially equal to that of the machine.

Mounted on a carrier 37 laterally of the elevator is a plant digging and throwing device comprising a share or digger 4 and a throwing wheel 5 having a plurality of forks 36 which, by well-known means not shown in the drawing, are kept substantially parallel to themselves during the rotation of the wheel in the counter-clockwise direction in Fig. 2. Preferably, the said device is vertically adjustable substantially parallel to itself. In the embodiment shown the carrier 37 is thus slidably mounted in vertical guides 38 on the frame 1, the wheel 5 being driven from the power unit 28 by means of a chain or rope transmission 42 and a telescope shaft 41 with universal joints 40. The carrier may be sustained on the machine frame by means of a vertically adjustable abutment, such as a set screw 39 provided with a hand-wheel, but means may also be provided for operating the carrier from the seat of the tractor driver.

Provided along the opposite edge of the elevator 6 is a, preferably upwardly, movable part 43 of an endless, grated baffle chain passing over pairs of wheels 44, 45 mounted in arms 47 and 48 respectively. The chain is preferably adjustable as to its inclination. To this end the shaft 46 of the wheel pair 45 may in known manner be adjustably mounted in slots 49 provided in the arms 48, the shaft being continuously driven from the power unit 28 by means, for instance, of a linked telescope shaft 50 similar to the parts 40, 41.

In operation, the working depth of the share 4 should be slightly larger than the depth of the plants, the latter being successively loosened from below by the share and thereupon thrown by the forks 36 in a transverse direction towards the baffle chain 43. This chain acts to loosen and remove a considerable part of the earth accompanying the plants, whereas the plants hitting the chain are caused to fall onto the elevator 6, the action of the baffle chain being modifiable by adjusting its inclination. The motion of the chain is adapted to prevent obstruction thereof. The horizontal plant receiving part of the elevator path is succeeded by an inclined part wherein the elevator, by well-known means not shown in the drawing, may be vibrated transversely in order to remove further quantities of earth and small stones from the material deposited on the inside of the elevator.

At the wheel pair 9 the elevator is adapted, by change of its direction to discharge, preferably directly, onto the first one of two or, better, three inclined conveyers or aprons 12, 13, 14 of substantially the same width as the elevator 6 and provided with pin-shaped vine catchers 15, said aprons being arranged in a row within the elevator and driven in the direction of the arrows 11 by means, for instance, of chain or rope transmissions 30, 31, 32 connecting them to the driven elevator wheels 8b. A laterally sloping, preferably grated chain or apron 16, 17 arranged substantially transversely to the preceding row of aprons has a part 16 situated, preferably, immediately below said aprons, and a succeeding part 17 which, in the embodiment shown, is sloping towards the part 16 and moving upwardly, this apron being driven from the power unit 28 by means, for instance, of a chain transmission 33 and a bevel gear 34.

The inclination and speed of the apron 12 is preferably such that, of the material received by this apron, substantially all vines and the like are carried on and discharged onto the apron 13, whereas a portion of the potatoes moves downwards the apron and falls onto the apron 16, 17, if necessary guided by a plate 18 mounted along the lower edge of this latter apron. In a similar manner the apron 13 separates a further quantity of the potatoes, and the apron 14 separates a possible rest thereof, whereas vines and the like are discharged at the upper end of this apron and fall to the ground laterally of the machine, guided by some chute not shown in the drawing. For the purpose of a suitable work-distribution in the series of separating aprons 12, 13, 14 the inclination of the aprons 13, 14 is greater than that of the apron 12, and the apron 14 may be more inclined than apron 13.

Vines and weeds possibly dropping from the aprons 13, 14 onto the apron 16, 17 are carried on by the latter which, too, may be provided with pin-shaped catchers, and are dropped to the ground from the upper end of this apron. The potatoes received by apron 16, 17 are, however, due to the lateral inclination of this apron, caused to move towards the lower edge of the apron where they may be collected. In the embodiment shown the apron is provided at this edge with a row of flights 19 by which the potatoes and accompanying stones are brought to the upper end of the apron and from there delivered to a stone separator 21 by means of a chute or a conveyer 20 driven, for instance, from an adjacent elevator wheel 8. Along the edges of the various aprons or conveyers stationary guides may of course be provided for the material conveyed.

The stone separator shown comprises three inclined screens 22, 23, 24 mounted one above another and each in known manner formed by a plurality of parallel, closely arranged, elastic strips 25. The tension of the strips in the various screens should be such that the screen 22 lets through all the stones and a minor portion of the potatoes, the screen 23 lets through all the stones and a minor portion of the potatoes passed through the screen 22, and the screen 24 lets through only stones. The screens 22 and 23 will thus, at their lower ends, deliver only potatoes which are collected in suitable manner. At its lower end the screen 24 delivers a mixture of stones and potatoes which, preferably, is restored to the screen 22. This may be accomplished in a simple manner by delivering the mixture onto the elevator 6 by means, for instance, of a belt conveyer 26 and a guide plate 27, the conveyer being preferably driven from the elevator driving wheels 8b by means of the transmissions 30, 31 and a further chain transmission 35. The machine thus operates practically without loss of potatoes, and it is capable of working rapidly and well also in fields that are rich in weeds.

While we have shown an embodiment of the invention by way of example, it is apparent that various other embodiments are possible within the scope of the invention as claimed.

We claim:

1. A potato harvesting machine comprising, in combination, an endless grated potato elevator chain movable in the longitudinal direction of the machine and comprising a lower substantially horizontal potato receiving part and a widely spaced upper part, an endless grated baffle chain movable around an upper shaft and a lower shaft, which lower shaft extends along and close to one edge of said receiving part, said baffle chain being driven in such a direction that the side turned towards the elevator chain is moved upwards for discharge of such stalks and leaves from potato plants thrown onto the said side of the baffle chain, which are caught by the baffle chain, a potato plant digging share located laterally of said receiving part and at the side opposite to the baffle chain, a rotatable shovel wheel for throwing the dug potato plants through the space between said upper and lower parts of the elevator chain and towards said baffle chain, a number of transversely extending catching members mounted on the inside of said elevator chain for lifting material dropped on said receiving part from the baffle chain and for discharge thereof from an upper position, and an endless travelling apron within said elevator chain for separating material discharged thereon by said catching members, said apron having its upper side travelling upwards and sloping at such an angle that stalks and leaves are carried away and discharged at the top end thereof and potatoes are rolling down the same.

2. A potato harvesting machine according to claim 1, and a second sloping endless travelling apron arranged with its lower end beneath the upper end of the first travelling apron and having its upper, upwardly travelling side sloping at an increased angle compared with the side of the first apron.

3. A potato harvesting machine comprising, in combination, an endless grated potato elevator chain movable in the longitudinal direction of the machine and comprising a lower substantially horizontal potato receiving part and a widely spaced upper part, an endless grated baffle chain movable around an upper shaft and a lower shaft, which lower shaft extends along and close to one edge of said receiving part, said baffle chain being driven in such a direction that the side turned towards the elevator chain is moved upwards for discharge of such stalks and leaves from potato plants thrown onto the said side of the baffle chain, which are caught by the baffle chain, a potato plant digging share located laterally of said receiving part and at the side opposite to the baffle chain, a rotatable shovel wheel for throwing the dug potato plants through the space between said upper and lower parts of the elevator chain and towards said baffle chain, a number of transversely extending catching members mounted on the inside of said elevator chain for lifting material dropped on said receiving part from the baffle chain and for discharge thereof from an upper position, an endless travelling apron within said elevator chain for separating material discharged thereon by said catching members, said apron having its upper side travelling upwards and sloping at such an angle that stalks and leaves are carried away and discharged at the top end thereof and potatoes are rolling down the same, and a transverse endless separating conveyor supported by shafts located inclined in vertical planes through the travelling direction of the machine, one portion of said conveyor being provided within said elevator chain beneath said endless travelling apron so as to receive material rolling down said apron, said portion having its transverse section sloping at such an angle from its upper edge to its lower edge that of the material received potatoes are rolling towards and collected at the lower one of said edges and stalks and leaves are prevented from lateral displacement and another portion of said conveyor being provided outside said elevator chain and directed upwards for conveying and discharge of the material thus collected and separated.

4. A potato harvesting machine comprising, in combination, an endless grated potato elevator chain movable in the longitudinal direction of the machine and comprising a lower substantially horizontal potato receiving part and a widely spaced upper part, an endless grated baffle chain movable around an upper shaft and a lower shaft, which lower shaft extends along and close to one edge of said receiving part, said baffle chain being driven in such a direction that the side turned towards the elevator chain is moved upwards for discharge of such stalks and leaves from potato plants thrown onto the said side of the baffle chain, which are caught by the baffle chain, a potato plant digging share located laterally of said receiving part and at the side opposite to the baffle chain, a rotatable shovel wheel for throwing the dug potato plants through the space between said baffle chain, a number of transversely extending catching members mounted on the inside of said elevator chain for lifting material dropped on said receiving part from the baffle chain and for discharge thereof from an upper position, and endless travelling apron within said elevator chain for separating material discharged thereon by said catching members, said apron having its upper side travelling upwards and sloping at such an angle that stalks and leaves are carried away and discharged at the top end thereof and potatoes are rolling down the same, a transverse endless separating conveyor supported by shafts located inclined in vertical planes through the travelling direction of the machine, one portion of said conveyor being provided within said elevator chain beneath said endless travelling apron so as to receive material rolling down said apron, said portion having its transverse section sloping at such an angle from its upper edge to its lower edge that of the material received potatoes are rolling towards and collected at the lower one of said edges and stalks and leaves are prevented from lateral displacement and another portion of said conveyor being provided outside said elevator chain and directed upwards for conveying and discharge of the material thus collected and separated, a stone separator, and a conveyor for transferring potatoes and stones from said separating conveyor to said stone separator.

5. A potato harvesting machine according to claim 4, in which said stone separator comprises a sloping screen formed by a plurality of parallel, closely arranged, elastic strips of such a tension that stones are passed through but potatoes roll over the screen.

CLAES BERG.
HERBERT CARLSSON.
REINHOLD V. EKMAN.

References Cited in the file of this patent
UNITED STATES PATENTS

| Number | Name | Date |
|---|---|---|
| 882,084 | Vaudrevil | Mar. 17, 1908 |
| 1,309,196 | Haug | July 8, 1919 |
| 1,487,273 | Sang | Mar. 18, 1924 |
| 1,828,261 | Stoltenberg | Oct. 20, 1931 |
| 1,937,159 | Niemeyer | Nov. 18, 1933 |
| 2,438,627 | Walz et al. | Mar. 30, 1948 |
| 2,464,305 | Greaves | Mar. 15, 1949 |
| 2,468,639 | Sample | Apr. 26, 1949 |
| 2,578,189 | Johnston | Dec. 11, 1951 |

FOREIGN PATENTS

| Number | Country | Date |
|---|---|---|
| 414,459 | Germany | June 5, 1925 |
| 71,552 | Sweden | Apr. 7, 1931 |
| 563,680 | Great Britain | Aug. 28, 1944 |